United States Patent [19]

Wang

[11] Patent Number: 5,103,001
[45] Date of Patent: Apr. 7, 1992

[54] SPIRODILACTAMS

[75] Inventor: Pen-Chung Wang, Houston, Tex.

[73] Assignee: Shell Oil Company, Houston, Tex.

[21] Appl. No.: 648,779

[22] Filed: Jan. 31, 1991

[30] Foreign Application Priority Data

Jun. 1, 1990 [NL] Netherlands .................. 9001255

[51] Int. Cl.$^5$ ............... C07D 273/00; C07D 491/00; C07D 403/00; C07D 487/00
[52] U.S. Cl. .................................. 544/70; 548/410; 548/147; 548/336; 548/374; 548/247; 548/249; 548/216; 546/15
[58] Field of Search ............... 548/410, 147, 336, 374, 548/247, 249, 216; 546/15; 544/70

[56] References Cited

U.S. PATENT DOCUMENTS

| | | | |
|---|---|---|---|
| 4,289,884 | 9/1981 | Barker | 546/283 |
| 4,567,283 | 1/1986 | Payne et al. | 549/546 |
| 4,939,251 | 7/1990 | Wang | 540/489 |
| 4,946,858 | 8/1990 | Wrobel | 548/410 |

OTHER PUBLICATIONS

Pariza et al., "An Improved Procedure for the Synthesis of 4-oxopimelate-derived materials", Synthetic Comm., 13(3), 243-254 (1983).
Cava et al., J. Am. Chem. Soc., 79, 1706-1709 (1959).

Primary Examiner—Patricia L. Morris
Assistant Examiner—Robert C. Whittenbaugh

[57] ABSTRACT

Novel 1,6-diaza [4.4] spirodilactams having heterocyclic-containing substituents on each spiro ring nitrogen atom are produced by reaction of a heterocyclic-substituted primary amine compound and a spirodilactam precursor selected from 4-oxoheptanedioic acid compounds or 1,6-dioxaspiro[4.4]nonane-2,7-dione compounds. The substituted spirodilactam products have a plurality of heterocyclic rings and are useful in biological applications and as stabilizers.

12 Claims, No Drawings

SPIRODILACTAMS

FIELD OF THE INVENTION

This invention relates to certain 1,6-diaza [4.4] spirodilactams which incorporate a non-hydrocarbyl substituent on each spiro ring nitrogen atom. More particularly, the invention relates to 1,6-diazaspiro[4.4]nonane-2,7-dione compounds substituted in the 1- and 6- positions with substituent groups containing a heterocyclic ring.

BACKGROUND OF THE INVENTION

The reaction of amino compounds, particularly primary amino compounds, is well known in the art. A commercial example of products of such a reaction, in the case of primary diamines, is the series of polymeric polyamides known and marketed as NYLON ®. By way of specific illustration, the product illustratively produced from hexamethylenediamine and adipic acid is known as NYLON 6,6. It is also known that lactones and spirodilactones, for some purposes, react in a manner similar to monocarboxylic and dicarboxylic acid, respectively. One class of spirodilactones that functions as a diacid in certain reactions is the 1,6-dioxospiro[4.4]nonane-2,7-dione produced by Pariza et al, *Synthetic Communications*, Vol. 13 (3), 243-254 (1983).

More recently, the reactions of 1,6-dioxospiro[4.4]nonane-2,7-dione compounds and 4-ketoheptanedioic acid compounds with primary monoamines and primary diamines has been shown to result, under appropriate conditions, in the formation of heterocyclic compounds, monomeric and polymeric, respectively. For example, Wang, U.S. Pat. No. 4,939,251, shows the reaction of hydroxy-substituted primary amines such as p-aminophenol with 4-ketoheptanedioic acid compounds or 1,6-dioxoaspiro[4.4]nonane-2,7-dione compounds to produce a 1,6-di(4-hydroxyphenyl)-1,6-diazaspiro[4.4]nonane-2,7-dione. These particular products, substituted spirodilactams, have substantial value as polymer precursors by virtue of the reactive hydroxyl groups of the hydroxylphenyl substituents.

The spirodilactams are, of course, heterocyclic compounds and compounds containing heterocyclic ring systems are known to have a number of additional uses which do not require the presence of additional reactive functional groups. For example, U.S. Pat. No. 4,567,283 and U.S. Pat. No. 4,289,884 describe a number of classes of heterocyclic compounds which have biological uses as plant growth regulators and herbicides, respectively. It is also known that heterocyclic compounds have utility as stabilizers for organic materials normally subject to degradation upon exposure to heat, light or oxygen. Benzothiazoles, particularly 2-mercaptobenzothiazole, are chemicals of commerce for such applications.

The class of 1,6-diaza [4.4] spirodilactams contains heterocyclic groups by the presence of the two lactam ring systems. It would be of advantage, however, to provide substituted spirodilactams of even greater heterocyclic functionality which are useful in biological, particularly agricultural, applications and as stabilizers.

SUMMARY OF THE INVENTION

This invention relates to novel 1,6-diaza [4.4] spirodilactam compounds. More particularly, the invention relates to substituted 1,6-diazaspiro[4.4]nonane-2,7-diones which contain as a substituent on each spiro ring nitrogen atom which incorporates a heterocyclic ring of from 1 to 2 heteroatoms selected from nitrogen, oxygen or sulfur.

DESCRIPTION OF THE INVENTION

The novel spirodilactam derivatives of the invention are N,N'-disubstituted 1,6-diaza [4.4] spirodilactams wherein each spiro ring nitrogen atom contains a heterocyclic ring having up to 2 heteroatoms of nitrogen, oxygen or sulfur. Although a wide variety of such substituted spirodilactam compounds with a wide variety of additional substituents are contemplated by the invention, a preferred class of spirodilactams are those 1,6-diaza [4.4] spirodilactams having up to 60 carbon atoms represented by the formula

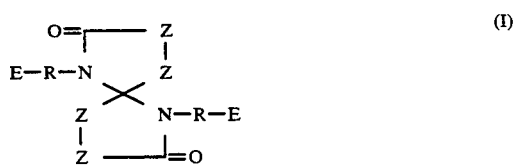

wherein R independently is a direct valance bond or R is aliphatic or aromatic of up to 10 carbon atoms, E independently is a heterocyclic ring system of from 1 to 2 rings, one or both of which are heterocyclic and aromatic or aliphatic, and up to 2 heteroatoms selected from nitrogen, oxygen or sulfur, and Z independently is $>C(Z')_2$ in which Z' is hydrogen, lower alkyl and preferably methyl, halo and preferably the lower halogens fluoro or chloro, and aryl and particularly phenyl, or Z is such that two adjacent Z groups taken together form a ring system Z" of from 5 to 7 ring atoms, up to 2 of which are heteroatoms selected from nitrogen, oxygen or sulfur with the remainder of the ring atoms being carbon atoms, there being up to 15 carbon atoms in each Z", two of which form a bridge between the two carbon atoms (spiro or central carbon atom and carbonyl carbon atom) connected by the adjacent Z groups.

In the above formula I, each R is a direct valence bond or is hydrocarbyl containing only atoms of hydrogen and carbon or is substituted hydrocarbyl additionally containing other atoms as inert carbon atom substituents such as halogen, particularly middle halogen, i.e., chlorine or bromine. Illustrative of aliphatic R groups are 1,2-ethylene, ethylidine, 1,3-propylene, 1,4-butylene, 2,2-dimethyl-1,3-propylene, 1,4-butylene, 2,2-dimethyl-1,3-propylene, 4-chloro-1,8-octene and 2,4-dichloro-1,6-hexene. The preferred aliphatic R groups are straight-chain polymethylene groups of the formula

wherein n is an integer from 1 to 6 inclusive. Exemplary aromatic R groups are phenylene, particularly 1,4-phenylene, 1,4-naphthalene and 2-bromo-1,4-phenylene. The preferred aromatic R group is 1,4-phenylene. Particularly preferred as R are direct valence bond, 1,2-ethylene or 1,4-phenylene.

The E moieties of the above formula I represent heterocyclic ring systems illustrated by pyridinyl, morpholyl, benzothiazolyl, imadazolyl, quinolinyl, methylenedioxyphenyl, N-methylpyrazolyl, isoxazolyl, oxazolyl, thizolyl, furanyl, pyrrolyl, pyridinyl dicarboxylic acid and furanyl dicarboxylic acid anhydride.

The novel spirodilactam compounds of the invention are produced from a heterocyclic-substituted amine and a spirodilactam precursor selected from 4-oxoheptanedioic acid compounds and 1,6-dioxa [4.4] spirodilactones. The substituted amine reaction is represented by the formula

wherein R and E have the previously stated meanings. In terms of the preferred R groups, illustrative heterocyclic-substituted amines of the above formula III are 2-aminoethyl-2-pyridine, 2-aminoethyl-2-benzothiazole, 2-(4-aminophenyl)morpholine, 2-aminoethylpiperidine, 4-amino-1,2-methylenedioxybenzene, 8-aminoquinoline and 5-aminoindazole.

When the spirodilactam precursor is a 4-oxoheptanedioic acid compound the precursor has up to 30 carbon atoms and is represented by the formula

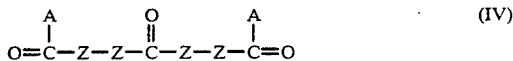

wherein A independently is hydroxy, alkoxy, preferably lower alkoxy of up to 4 carbon atoms, or halo, preferably middle halo, and Z has the previously stated meaning. In the embodiment of the ketodiacid spirodilactam precursor wherein Z is acyclic and not a part of a fused ring system, each Z moiety is $>C(Z')_2$ and the ketodiacid spirodilactam precursor is an acyclic 4-oxoheptanedioic acid compound represented by the formula

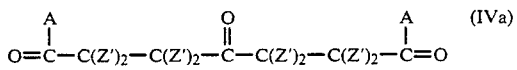

Illustrative of acyclic 4-oxoheptanedioic acid compounds are 4-oxoheptanedioic acid, dimethyl 4-oxoheptanedioate, 2,6-dimethyl-4-oxoheptanedioic acid, 2,3,5,6-tetramethyl-4-oxoheptanedioyl chloride, 3,5-diethyl-4-oxoheptanedioic acid, di-n-propyl 2,6-di-n-butyl-4-oxoheptanedioate and 6-carbomethoxy-3,3,5,5-tetramethyl-4-oxohexaneoic acid. The preferred ketodiacid compounds of the above formula IVa are those wherein each Z' is hydrogen or methyl, especially hydrogen, and A is hydroxy or alkoxy, especially hydroxy. Many of the acyclic ketodiacids of the above formula IVa are known compounds or are produced by known methods such as the process of U.S. Pat. No. 4,800,231. The interconversion of the acids, esters and acid halides of the formulas IV including formula IVa is also conventional.

In a second embodiment of the ketodiacid spirodilactam precursor, the 4-ketodiacid compounds incorporate cyclic moieties between the carbonyl carbon and the carboxy function, i.e., the two adjacent Z groups form a cyclic structure. Such cyclic diacid compounds are represented by the formula

wherein A and Z" have the previously stated meanings. Illustrative of these ketodiacid compounds are di(2-carboxyphenyl) ketone, di(2-carbethoxyphenyl) ketone, di(2-carboxycyclohexyl) ketone, di(2-carbopropoxycyclo-4-pentenyl) ketone, di(2-chlorocarbonylphenyl) ketone, di(2-carboxypyridyl) ketone, di(3-carboxy-2-morpholyl) ketone and 2-carboxyphenyl N-methyl-3-carboxy-2-pyrryl ketone. The preferred cyclic ketodiacid compounds of this formula IVb are those wherein Z" is a ring system of from 5 to 6 atoms inclusive and up to one nitrogen heteroatom. Such cyclic ketodiacid compounds are produced by known methods including the method described by U.S. Pat. No. 1,999,181 or by Cava et al, *J. Am. Chem. Soc.*, 77, 6022 (1955).

In yet another embodiment of the ketodiacid spirodilactam precursor the ketodiacid incorporates one cyclic moiety and acyclic moieties and is represented by the formula

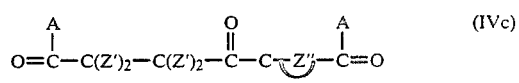

wherein A, Z' and Z" have the previously stated meanings. Such ketodiacids of one cyclic moiety are illustrated by 3-(2-carboxybenzoyl)propionic acid, 3-(2-carbomethoxy-2-pyridyloyl)-2-ethylpropionic acid, ethyl 3-(2-carbethoxybenzoyl)propionate and 3-(3-carboxy-4-methylbenzoyl)butyrl chloride. The ketodiacids of one cyclic moiety of the above formula IVc are known compounds or are produced by known methods.

In a second modification of the invention the spirodilactam precursor is a 1,6-dioxaspiro[4.4]nonane-2,7-dione compound which is substituted or unsubstituted (except with hydrogen) and wherein the spiro ring carbon atoms are otherwise acyclic or form additional cyclic moieties fused to the spirodilactone ring. One such class of spirodilactone spirodilactam precursors is represented by the formula

wherein Z has the previously stated meaning.

In one embodiment of the spirodilactone spirodilactam precursor, each Z moiety is $>C(Z')_2$ and the precursor is represented by the formula

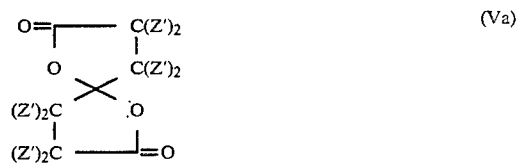

wherein Z' has the previously stated meaning. Illustrative of such spirodilactones are 1,6-dioxaspiro[4.4]nonane-2,7-dione, 3,8-dimethyl-1,6-dioxaspiro[4.4]nonane-2,7-dione, 3,4,8,9-tetramethyl-1,6-dioxaspiro[4.4]nonane-2,7-dione, 4,9-diphenyl-1,6-dioxaspiro[4.4]nonane-2,7-dione, 3,3,8,8-tetramethyl-1,6-dioxaspiro[4.4]nonane-2,7-dione, 3,3,4,4,8,8,9,9-octamethyl-1,6-dioxaspiro[4.4]nonane-2,7-dione and 3,4,8,9-tetrafluoro-1,6-dioxaspiro[4.4]-nonane-2,7-dione. The preferred compounds of formula Va are those wherein at least one Z' of each Z'-substituted carbon atom is hydrogen. Such compounds are known compounds or are produced by known methods such as the process of Pariza et al, *Synthetic Communications*, Vol. 13(3), pp. 243-254 (1983).

In the embodiment of the spirodilactone spirodilactam precursor which incorporate a fused cyclic moiety as a part of each of the two spiro rings the spirodilactones are represented by the formula

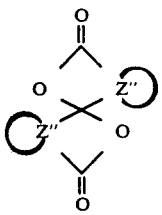
(Vb)

wherein Z" has the previously stated meaning. Typical compounds of this formula are 3,4,8,9-dibenzo-1,6-dioxospiro[4.4]nonane-2,7-dione, 3,4,8,9-di(cyclopentano)-1,6-dioxaspiro[4.4]nonane-2,7-dione, 3,4,8,9-di(4-methylbenzyl)-1,6-dioxaspiro[4.4]nonane-2,7-dione and 3,4,8,9-di(pyrido)-1,6-dioxaspiro[4.4]nonane-2,7-dione. These compounds are known or are produced by known methods such as the process of Cava et al. *J. Am. Chem. Soc.*, 79, 1706-1709 (1959) or the process disclosed in U.S. Pat. No. 1,999,181.

In a third embodiment of the spirodilactone spirodilactam precursor, a cyclic moiety is fused to one spiro ring and the other spiro ring is free from fused cyclic moieties. Such spirodilactones are represented by the formula

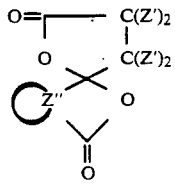
(Vc)

wherein Z' and Z" have the previously stated meanings. Such spirodilactones of one fused cyclic moiety are illustrated by 3-methyl-8,9-benzo-1,6-dioxaspiro[4.4]nonane-2,7-dione, 3,4-benzo-1,6-dioxaspiro[4.4]nonane-2,7-dione and 3,3,4,4-tetramethyl-8,9-morpholino-1,6-dioxaspiro[4.4]nonane-2,7-dione. Spirodilactones of formula Vc are produced by dehydration of the corresponding ketodiacids. For example, 3-(2-carboxyphenyl)propionic acid is dehydrated by application of heat to produce 3,4-benzo-1,6-dioxaspiro[4.4]nonane-2,7-dione.

In general, the preferred spirodilactone spirodilactam precursors are hydrocarbon except for the oxygen atoms of the lactone moieties and particularly preferred are those spirodilactones which are free from fused ring substituents (formula Va) or which have a fused substituent on each of the spiro rings (formula Vb). The compounds 1,6-dioxaspiro[4.4]nonane-2,7-dione and 3,4,8,9-dibenzo-1,6-dioxaspiro[4.4]nonane-2,7-dione are especially preferred spirodilactone spirodilactam precursors.

To produce the novel heterocyclic-substituted spirodilactams of the invention the aminoheterocyclic compound of formula III is contacted with the spirodilactam precursor (formula IV or V) under reaction conditions of elevated temperature. In one embodiment, the aminoheterocyclic compound and spirodilactam precursor are merely mixed and the resulting reaction mixture is heated to produce the desired heterocyclic-substituted spirodilactam (formula I). In an alternate embodiment the reaction takes place in a liquid phase in the presence of an inert reaction diluent in which the aminoheterocyclic compound and the spirodilactam precursor are at least partially soluble. Preferred reaction diluents of this embodiment are liquid polar reaction diluents including dialkyl ketones such as methyl ethyl ketone and di-i-butyl ketone, esters such as butyl acetate and methyl 2-ethylhexamoate, ethers including acyclic ethers such as diethyleneglycol diethyl ether and tetraethyleneglycol dimethyl ether as well as cyclic ethers such as tetrahydrofuran and dioxane, sulfur-containing diluents such as sulfolane and dimethyl sulfoxide, and N-alkylamides such as dimethylformamide, N,N-dimethylacetamide and N-methyl-2-pyrrolidone. The N-methylamides constitute a preferred class of reaction diluents, especially N-methylpyrrolidone.

The spirodilactam precursor and aminoheterocyclic compound are contacted at a temperature from about 80° C. to about 250° C. but preferably from about 100° C. to about 200° C. The pressure employed is that pressure required to maintain the reaction mixture in a non-gaseous state. Typically, such pressures are up to about 20 atmospheres but more often from about 0.8 atmosphere to about 10 atmospheres. The ratio of spirodilactam precursor to aminoheterocyclic compound is not critical and molar reactant ratios of from about 10:1 to about 1:10 are satisfactory. Preferred molar reactant ratios are from about 5:1 to about 1:5. The spirodilactam precursor, aminoheterocyclic compound and reaction diluent of diluent is employed are charged to a suitable reactor and maintained at reaction conditions. Reactant contact is often maintained during reaction by shaking, stirring or refluxing. Subsequent to reaction the heterocyclicsubstituted spirodilactam is recovered from the product mixture, if necessary, by conventional methods such as extraction, chromatographic separation or precipitation with a non-solvent. When the molar ratio of reactants is at or near stoichiometric, i.e., a 2:1 molar ratio of aminoheterocyclic compound to spirodilactam precursor, the selectivity of the reaction is such that the product is useful as such without the need for separation or recovery.

The compounds of the present invention include spirodilactams with a wide variety substituent groups including the heterocyclic portion of the spiro ring nitrogen substituents. Illustrative of the heterocyclic-substituted spirodilactams are 1,6-di(2-pyridinylethyl)-1,6-diazaspiro[4.4]nonane-2,7-dione, 1,6-di(isoxazolylpropyl)-1,6-diazaspiro[4.4]nonane-2,7-dione, 1,6-di(3,4-methylenedioxy-2-phenyl)-1,6-diazaspiro[4.4]nonane-2,7-dione, 1,6-di[2-(3-morpholinyl)ethyl]-3,8-dimethyl-1,6-diazaspiro[4.4]nonane-2,7-dione, 1,6-di[6-(2-furanyl)hexyl]-3,4,8,9-dibenzo-1,6-diazaspiro[4.4]nonane-2,7 and 1,6-di(3-methyl-5-oxo-2-pyrazolin-1-yl)-1,6-diazaspiro[4.4]nonane-2,7-dione.

The heterocyclic-substituted 1,6-diaza [4.4] spirodilactams find utility in biological applications and particularly in agricultural applications where they are useful as herbicides and plant growth regulators. Moreover, the substituted spirodilactams are usefully employed as stabilizers for organic materials such as thermoplastics and lubricating oils which are normally subject to degradation upon exposure to oxygen.

The invention is further illustrated by the following Illustrative Embodiments which should not be regarded as limiting.

ILLUSTRATIVE EMBODIMENT I

A mixture of 25 g (0.192 mole) of 4-(2-aminoethyl)-morpholine and 14.9 g (0.096 mole) of 1,6-dioxospiro[4.4]nonane-2,7-dione is charged to a 100 ml round-bottom flask equipped with a mechanical stirrer and a reflux condenser. The mixture was heated to 150° C.–160° C. and maintained at or near this temperature range for 12 hours. The resulting product mixture was allowed to cool to ambient temperature and the product, isolated as a heavy syrup, removed from the flask. A sample of the product was analyzed by $^{13}$C-NMR analysis. The NMR spectra were consistent with the structure 1,6-di[2(2-morpholyl)ethyl]-1,6-diazaspiro[4.4]nonane-2,7-dione, obtained in a calculated yield of 57%.

ILLUSTRATIVE EMBODIMENT II

A mixture of 10 g (0.082 mole) of 2-aminoethylpyridine and 6.4 g (0.041 mole) of 1,6-dioxaspiro[4.4]nonane-2,7-dione were charged to a 100 ml round-bottom flask, heated to 150° C.–160° C. and maintained within this temperature range for 12 hours. The resulting product mixture was then allowed to cool to ambient temperature and the resulting product, isolated as a heavy syrup, was removed from the flask. A portion of the product was analyzed by $^{13}$C-NMR analysis. The NMR spectra were consistent with 1,6-di[3-(2-pyridyl)ethyl]-1,6-diazaspiro[4.4]nonane-2,7-dione, obtained in a calculated yield of 67%.

ILLUSTRATIVE EMBODIMENT III

A mixture of 24.03 g (0.1 mole) of 2-(4-aminophenyl)-6-methylbenzothiazole, 7.8 g (0.05 mole) 1,6-dioxaspiro[4.4]nonane-2,7-dione and 50 ml of N-methylpyrrolidone was placed in a 100 ml round-bottom flask, heated to 150° C.–160° C. and maintained at that temperature range for 12 hours. The resulting mixture was allowed to cool to ambient temperature and poured into methanol. The precipitated product was recovered by filtration and dried in a vacuum oven at 100° C. for 12 hours. A portion of the product was analyzed by $^{13}$C-NMR analysis. The spectra were consistent with the structure 1,6-di[4-(6-methyl-2-benzothiazolyl)phenyl]-1,6-diazaspiro[4.4]nonane-2,7-dione.

What is claimed is:

1. The spirodilactam of up to 60 carbon atoms represented by the formula

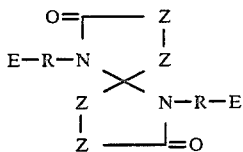

wherein R independently is a direct valence bond or R is aliphatic or aromatic of up to 10 carbon atoms, E independently is a heterocyclic ring system selected from pyridinyl, morpholyl, benzothiazolyl, imidazolyl, quinolinyl, methylenedioxyphenyl, N-methylpyrazolyl, isoxazolyl, oxazolyl, thiazolyl, furanyl, pyrrolyl, pyridinyl dicarboxylic acid or furanyl dicarboxylic acid anhydride, and Z independently is $>C(Z')_2$ wherein $Z'$ independently is hydrogen, lower alkyl, halo or aryl.

2. The spirodilactam of claim 1 wherein each Z is $>C(Z')_2$ in which $Z'$ independently is hydrogen or methyl.

3. The spirodilactam of claim 2 wherein each R is aliphatic.

4. The spirodilactam of claim 3 wherein R is 1,2-ethylene.

5. The spirodilactam of claim 4 wherein E is 2-pyridinyl.

6. The spirodilactam of claim 3 wherein E is 2-morpholyl.

7. The spirodilactam of claim 3 wherein E is 2-benzothiazolyl.

8. The spirodilactam of claim 3 wherein E is 6-methyl-2-benzothiazole.

9. The spirodilactam of claim 3 wherein each R is aromatic.

10. The spirodilactam of claim 9 wherein R is phenylene.

11. The spirodilactam of claim 9 wherein R is 1,4-phenylene.

12. The spirodilactam of claim 11 wherein E is 2-benzothiazolyl.